United States Patent [19]

Land

[11] Patent Number: 4,694,029

[45] Date of Patent: Sep. 15, 1987

[54] HYBRID PHOTOCURE SYSTEM

[75] Inventor: John M. Land, Kansas City, Mo.

[73] Assignee: Cook Paint and Varnish Company, Kansas City, Mo.

[21] Appl. No.: 721,395

[22] Filed: Apr. 9, 1985

[51] Int. Cl.$^4$ .................. C08F 2/50; C08G 59/62; C08G 59/68; C08G 59/72

[52] U.S. Cl. .......................... 522/8; 522/15; 522/21; 522/25; 522/26; 522/31; 522/63; 522/81; 522/121; 522/170

[58] Field of Search .............. 204/159, 11; 522/170, 522/8, 63

[56] References Cited

U.S. PATENT DOCUMENTS

| | | | |
|---|---|---|---|
| 3,794,609 | 2/1974 | Metil | 523/456 |
| 4,026,705 | 5/1977 | Crivello et al. | |
| 4,058,401 | 11/1977 | Crivello | |
| 4,069,054 | 1/1978 | Smith | |
| 4,069,055 | 1/1978 | Crivello | |
| 4,112,146 | 9/1978 | Lazear | |
| 4,144,156 | 3/1979 | Kuesters et al. | |
| 4,156,035 | 5/1979 | Tsao | 427/44 |
| 4,173,476 | 11/1979 | Smith et al. | |
| 4,197,174 | 4/1980 | Chang | |
| 4,218,531 | 8/1980 | Carlson | 204/159.11 |
| 4,287,228 | 9/1981 | Schlesinger | |
| 4,323,591 | 4/1982 | Wendling et al. | |
| 4,390,453 | 6/1983 | Eichler et al. | |
| 4,423,136 | 12/1983 | Crivello | |
| 4,428,807 | 1/1984 | Lee et al. | |

OTHER PUBLICATIONS

Macromolecules, vol. 14, No. 5, Sep.–Oct. 1981, pp. 1141–1147, Crivello et al.

Primary Examiner—John C. Bleutge
Assistant Examiner—A. H. Koeckert
Attorney, Agent, or Firm—Cushman, Darby & Cushman

[57] ABSTRACT

A photopolymerizable composition comprises a polymerizable epoxy-containing material, a polymerizable monomer or monomers containing one or more

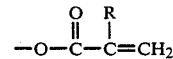

groups wherein R is H or CH$_3$, a cationic photoinitiator, a radical-type photoinitiator and an alcohol accelerator.

9 Claims, No Drawings

HYBRID PHOTOCURE SYSTEM

BACKGROUND OF THE INVENTION

The present invention relates to a photopolymerizable composition and particularly to a composition comprising a mixture of epoxy-containing materials and polymerizable monomers containing one or more

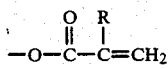

groups wherein R is hydrogen or —CH$_3$. More particularly the present invention relates to a photopolymerizable composition containing in addition to a polymerizable epoxy containing material and a polymerizable monomer, as defined above, an effective amount of a cationic photo-initiator, an effective amount of a radical-type photoinitiator and an alcohol accelerator.

Heretofore, photocurable epoxy-containing materials have been photopolymerized in the presence of a diaryliodonium complex salt photoinitiator and/or a triaryl sulfonium complex salt upon exposure to a source of radiation emitting actinic radiation in the ultraviolet region of the spectrum.

It has also been known to photopolymerize ethylenically unsaturated compounds in the presence of free radical photoinitiators on exposure to visible light and ultraviolet radiation.

Recently, in U.S. Pat. No. 4,156,035 to Tsao et al, there is disclosed a radiation curable composition containing a mixture of epoxy resin and di- or polyacrylate or methacrylate terminated monomers in combination with a catalyst system comprising a carbonyl type photoinitiator with an aromatic onium salt capable of effecting the cure by release of a Lewis acid.

While known all di- or polyacrylate or methacrylate and all epoxy resin systems have certain advantages, such systems often suffer from certain significant disadvantages which prevent their use in some practical applications. For instance, it is known that these homogeneous systems often require ultraviolet radiation to cure the same and exposure to sunlight alone fails to provide an acceptable cure in terms of a sufficiently short cure time as well as in terms of an essentially tack-free condition within an acceptable short cure time. Also it is known that di- or polyacrylate or methactylate systems are often air inhibited and require a nitrogen blanket or other inert atmosphere in order to cure tack-free.

SUMMARY OF THE INVENTION

In accordance with the present invention the abovedisadvantages are avoided. Thus the present invention provides a photopolymerization operation wherein the photopolymerizable composition can be cured by exposure to sunlight as well as by exposure to conventional sources of ultraviolet radiation such as medium or high pressure mercury lamps. The system of the present invention is not air (oxygen) inhibited as are conventional U.V. acrylic systems which require a nitrogen blanket, or an oxygen scavenger. Moreover, relatively thick films, i.e. at least one mil thick and thicker can be cured to a tack-free condition in relatively shodrt cure times on exposure to both sunlight and ultraviolet light.

Further, pigmented films based on the system of the present invention can be cured by sunlight or conventional sources of ultraviolet radiation as noted above. The use of an accelerator in the system of this invention also provides another degree of formulation latitude to achieve film properties such as flexibility, hardness and solvent resistance. The accelerator is a reactive diluent which can minimize or eliminate the use of more toxic acrylic diluents.

Thus, the present invention relates to a photopolymerizable composition comprising in combination an epoxy-containing material, a polymerizable monomer or monomers containing one or more

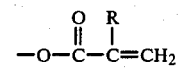

groups wherein R is hydrogen or —CH$_3$, a cationic photoinitiator, a radical-type photoinitiator and an alcohol accelerator.

DETAILED DESCRIPTION OF THE INVENTION

The polymerizable epoxy-containing materials useful in the present invention are any organic compounds having an oxirane ring, i.e.

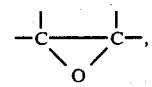

polymerizable by ring opening. Such materials, broadly called epoxides, include monomeric epoxy compounds and epoxides of the polymeric type and can be aliphatic, cycloaliphatic or aromatic. Moreover, these cationically cured components can be mixtures of cycloaliphatic and glycidyl type epoxides or mixtures of cycloaliphatic epoxides and cyclic ethers.

The epoxy-containing materials generally have, on the average, at least one polymerizable epoxy group per molecule, preferably two or more epoxy groups per molecule.

The polymeric epoxides include linear polymers having terminal epoxy groups (e.g. a diglycidyl ether of a polyoxyalkylene glycol), polymers having skeletal oxirane units (e.g. polybutadiene polyepoxide) and polymers having pendant epoxy groups (e.g. a glycidyl methacrylate polymer or copolymer).

The molecular weight of the epoxy-containing materials can vary from 58 to about 100,000 or more. Mixtures of various epoxy-containing materials can also be used in the present invention.

Useful epoxy-containing materials include those which contain cyclohexane oxide groups such as the epoxycyclohexane-carboxylates, typified by 3,4-epoxycyclohexylmethyl-3,4 epoxycyclohexane carboxylate, 3,4-epoxy-2-methylcyclohexylmethyl-3,4-epoxy-2-methylcyclohexane carboxylate, bis(3,4-epoxy-6-methylcyclohexylmethyl)adipate, bis(3,4-epoxycyclohexyl)adipate and 2(3,4-epoxycyclohexyl-5,5-spiro-3,4 epoxy)cyclohexane-meta dioxane.

Further, epoxy-containing materials which are also useful in the present invention include glycidyl ether monomers of the formula

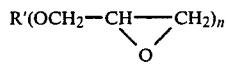

wherein R' is alkyl or aryl, and n is an integer of 1 to 6. Examples are the glycidyl ethers of polyhydric phenols obtained by reacting a polyhydric phenol with an excess of chlorohydrin such as epichlorohydrin (e.g. the diglycidyl ether of 2,2-bis-(2,3-epoxypropoxyphenol)-propane).

A significant number of commercially available epoxy-containing materials which can be employed in the present invention include, in particular, octadecylene oxide, dioxane, epichlorohydrin, styrene oxide, vinylcyclohexene oxide, glycidol, glycidylmethacrylate, diglycidyl ether of bisphenol A, e.g. those available under the trade designations "Epon 828", "Epon 1004" and "Epon 1010", "DER-331", "DER-332" and "DER-334", vinylcyclohexane dioxide (e.g. "ERL-4206"), 3,4-epoxycyclohexyl-methyl-3,4-epoxycyclohexane carboxylate (e.g. "ERL-4221"), 3,4-epoxy-6-methylcyclohexylmethyl-3,4-epoxy-6-methylcyclohexene-carboxylate (e.g. "ERL-4201"), bis(3,4-epoxy-6-methylcyclo-hexylmethyl)adipate (e.g. "ERL-4289"), bis(2,3-epoxycyclopentyl)ether (e.g. "ERL-0400"), aliphatic epoxy modified with propylene glycol (e.g. "ERL-4050" and "ERL-4052"), dipentene dioxide (e.g. "ERL-4269"), epoxidized polybutadiene (e.g. "Oxiron 2001"), silicone resin containing epoxy functionality, epoxy silanes (e.g. beta-(3,4-epoxy cyclohexyl)ethyltrimethoxy silane and gamma-glycidoxypropyltrimethoxy silane), flame retardant epoxy resins (e.g. "DER-580"), a brominated bisphenol type epoxy resin, 1,4-butanediol diglycidyl ether (e.g. "Araldite RD-2"), polyglycidyl ether of phenolformaldehyde novolak (e.g. "DEN-431" and "DEN-438") and resorcinol diglycidyl ether (e.g. "Kopoxite").

The polymerizable monomer containing two or more

groups include, for instance:
ethylene glycol diacrylate,
hexane-1,6-diol diacrylate,
propoxylated bisphenol A diacrylate,
propoxylated bisphenol A dimethacrylate,
trimethylolpropane diacrylate,
pentaerythritol triacrylate,
pentaerythritol trimethacrylate,
trimethylolpropane triacrylate,
trimethylolpropane trimethacrylate,
hexane-1,6-diol dimethacrylate,
1,3-butylene glycol dimethacrylate,
diethylene glycol diacrylate,
neopentyl glycol diacrylate,
pentaerythritol tetraacrylate, and
polyethylene glycol diacrylate.

These acrylates can be used alone or in admixture or even in admixture with monoacrylates and methacrylates as well as with vinyl monomers or materials possessing dual functionality such as vinyl epoxy or vinyl hydroxy.

The weight ratio of the epoxy-containing material to the polymerizable acrylate or methacrylate monomer can vary between wide limits. Moreover, the total combined weight of epoxy containing material and acrylate or methacrylate monomer ranges from 1-99 weight percent, preferably 5 to 70 weight percent, based on the total weight of the composition.

The cationic photoinitiator employed in the present invention preferably is an aromatic sylfonium compound having the formula

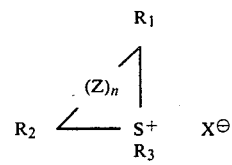

wherein $R_1$, $R_2$ and $R_3$ can be the same or different, provided that at least one of such groups is aromatic, and such groups can be selected from aromatic groups having 4 to 20 carbon atoms (e.g. substituted and unsubstituted phenyl, thienyl and furanyl) and alkyl radicals having 1 to 20 carbon atoms, said alkyl being substituted or not and when substituted, the substituents can be for example, halogen, hydroxhy, alkoxy and aryl. Preferably $R_1$, $R_2$ and $R_3$ are each aromatic. Z is selected from the groups consisting of oxygen, sulfur,

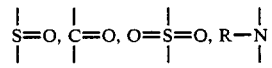

wherein R is an aryl (of 6 to 20 carbon atoms, such as phenyl) or acyl (of 2 to 20 carbon atoms, such as acetyl, benzoyl, etc.) carbon-to-carbon bond or

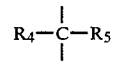

wherein $R_4$ and $R_5$ are selected from the group consisting of hydrogen, an alkyl radical having 1 to 4 carbon atoms, and an alkoxy radical having 2 to 4 carbon atoms; n is 0 or 1; and $X^\gamma$ is an anion. Preferably X is selected from tetrafluoroborate, hexafluorophosphate, hexafluoroarsenate and hexafluoroantimonate.

The sulfonium complex salts are substituted with at least one, and preferably three, aromatic groups. Representative groups are aromatic groups having 4 to 20 carbon atoms and are selected from phenyl, thienyl and furanyl groups. These aromatic groups may optionally have one or more fused benzo rings (e.g. naphthyl and the like, benzothienyl, dibenzothienyl, benzofuranyl, dibenzofuranyl, etc.). Such aromatic groups may also be substituted, if desired, by one or more of the following groups, or by other groups which are essentially nonreactive with other components present in the particular composition in which the complex salt is to be used: halogen, nitro, aryl, ester groups (e.g. alkoxycarbonyl such as methoxycarbonyl and ethoxycarbonyl, phenoxycarbonyl and acyloxy such as acetoxy and propionyloxy), sulfo ester groups (e.g. alkoxysulfonyl such as methoxysulfonyl and butoxysulfonyl, phenoxysulfonyl and the like), amido groups (e.g. acetamido, butyramido, ethylsulfonamido, and the like), carbamyl groups (e.g. carbamyl, N-alkylcarbamyl, N-phenylcarbamyl and the like), sulfamyl groups (e.g. sulfamyl, N-alkylsulfamyl, N,N-dialkylsulfamyl, N-phenylsulfamyl and the like), alkoxy groups (e.g. methoxy, ethoxy, butoxy and the like), aryl groups (e.g. phenyl), alkyl groups (e.g. methyl, ethyl, butyl and the like), aryloxy groups (e.g. phenoxy), alkylsylfonyl groups (e.g. methylsulfonyl, ethylsulfonyl and the like), arylsulfonyl groups (e.g. phenylsulfonyl), perfluoroalkyl groups (e.g. trifluoromethyl, perfluoroethyl and the like), and perfluoroalkylsulfonyl groups (e.g. trifluoromethylsulfonyl, perfluorobutylsulfonyl and the like).

Examples of suitable aromatic sulfonium complex salt photoinitiators include:
triphenylsulfonium tetrafluoroborate,
methyldiphenylsulfonium tetrafluoroborate,
dimethylphenylsulfonium hexafluorophosphate,
triphenylsulfonium hexafluorophosphate,
triphenylsulfonium hexafluoroantimonate,
diphenylnaphthylsulfonium hexafluoroarsenate,
tritolysulfonium hexafluorophosphate,
anisyldiphenylsulfonium hexafluoroantimonate,
4-butoxyphenyldiphenylsulfonium tetrafluoroborate,
4-chlorophenyldiphenylsulfonium hexafluoroantimonate,
tris(4-phenoxyphenyl)sulfonium hexafluorophosphate,
di(4-ethoxyphenyl)methylsulfonium hexafluoroarsenate,
4-acetonylphenyldiphenylsulfonium tetrafluoroborate,
tris(4-thiomethoxyphenyl)sulfonium hexafluorophosphate,
di(methoxysulfonylphenyl)methyl sulfonium hexafluoroantimonate,
di(methoxynapthyl)methyl sulfonium tetrafluoroborate,
di(carbomethoxyphenyl)methyl sulfonium hexafluorophosphate,
4-acetamidophenyldiphenylsulfonium tetrafluoroborate,
dimethylnaphthylsulfonium hexafluorophosphate,
trifluoromethyldiphenylsulfonium tetrafluoroborate,
methyl(N-methylphenothiazinyl)sulfonium hexafluoroantimonate,
phenylmethylbenzylsulfonium hexafluorophosphate,
10-methylphenoxathiinium hexafluorophosphate,
5-methylthianthrenium hexafluorophosphate,
10-phenyl-9,9-dimethylthioxanehenium hexafluorophosphate,
10-phenyl-9-oxothioxanthenium tetrafluoroborate,
5-methyl-10-oxothianthrenium tetrafluoroborate, and
5-methyl-10,10-dioxothianthrenium hexafluorophosphate.

Also usefully employed as the cationic photoinitiator is an aryliodonium salt of the formula

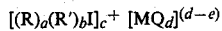

wherein R is a monovalent aromatic organic radical, R' is a divalent aromatic organic radical, M is a metal or metalloid, and Q is a halogen radical, a is a whole number equal to 0 or 2, b is a whole number equal to 0 or 1, the sum a+b is equal to 2 or the valence of I, c=d−e, e=the valence of M and is an integer equal to 2 to 7 inclusive and d>e and is an integer having a value up to 8.

More particularly, the aryliodonium salt employed in the present invention is a diaryliodonium salt having the formula Ar—I+—Ar X− wherein Ar is an aryl group and X− is $BF_4^-$, $AsF_6^-$, $PF_6^-$ and $SbF_6^-$. The aryl moiety of these diaryliodonium salts can have the same values as the aryl radicals set forth above for the aromatic sulfonium compounds. Representative diaryliodonium salts include 4,4'-dimethyldiphenyliodonium hexafluoroarsenate, 4,4'-di-t.-butyldiphenyliodonium hexafluoroarsenate, 4,4'-diisopropyldiphenyliodonium hexafluoroarsenate, 4,4'-diisopropyldiphenyliodonium tetrafluoroborate, 4,4'-dimethyldiphenyliodonium hexafluoroborate, 4,4'-dimethyldiphenyliodonium hexafluorophosphate, 4,4'-diisopropyldiphenyliodonium hexafluorophosphate and 4,4'-diisopropyldiphenyliodonium hexafluoroantimonate.

The above cationic photoinitiators are known and recognized in the art, including inter alia, U.S. Pat. Nos. 2,807,648; 3,981,897; 4,058,401; 4,026,705; 4,069,055; 4,173,476 and 4,423,136 as well as Belgium Pat. Nos. 828,841; 837,782; 828,670 and 833,472.

The cationic photoinitiator is generally present in an amount of about 0.06 to 6.0 percent by weight based on the total weight of the composition.

The radical-type photoinitiator, i.e. a carbonyl type photoinitiator usefully employed in the present invention includes those listed below. These radical-type photoinitiators are known to photodecompose to free radicals in the presence of UV light. Representative ones include benzophenone, acetophenone, methylethyl ketone, valerophenone, hexanophenone, α-phenylbutyrophenone, di benzosuberone, p-diacetylbenzene, 4'-methoxyacetophenone, benzaldehyde, α-tetralone, 2-acetylphenanthrene, 10-thioxanthenone, 9-fluorenone, 1-indianone, thioxanthene-9-one, xanthene-9-one, 7-H-benz[d]anthracene-7-one, 1-naphthaldehyde, fluorene-9-one, 1'-acetonaphthone, 2'-acetonaphthone, o-methoxybenzophenone, benz[a]anthracene-7,12-dione, benzoin isopropylether, 1,1-dimethoxy-1-phenyl acetophenone, benzoin isobutyl ether, benzoin tetrahydropyranyl ether, 2,2-diethoxyacetophenone, 2,2-dimethoxy-2-phenylacetophenone, 2,3-butanedione, hydroxycyclohexyl phenyl ketone, and benzil.

Generally, the radical-type photoinitiator is present in an amount of about 0.1 to 10 percent by weight based on the total weight of the photopolymerizable composition.

The alcohol accelerator employed in the present invention is present in amounts such that the number of epoxy equivalents ranges from 14 to 1.2 per equivalent of alcohol accelerator.

While tetrahydrofurfuryl alcohol is the preferred accelerator, other accelerators can also be employed. Representative other accelerators usefully employed in the present invention include such mono-alcohols as n-butanol, diols such as diethylene glycol, polyethylene oxide diols and tripropylene glycol, triols such as glycerine and polyethylene oxide triols, cyclic ether-alcohols or ether-alcohols such as ethylene glycol monoethyl ether, and butoxy ethanol. Moreover, the accelerator can also comprise a mixture of diols, and triols, with preferably tetrahydrofurfuryl alcohol, although other monofunctional alcohols can be used.

There can also be included in the photocurable composition of the present invention conventional additives such as pigments including titanium dioxide, and iron oxides as well as barytes, calcium carbonate, ultramarine blue, gypsum, quartz, diatomaceous silica, synthetic silica, clay, talc, mica, bentonite, glass fibers, white lead, antimony oxide, lithophone, aluminum powder and the like. Preferably pigments are present in an amount ranging from 5 to 85 percent by weight based on the total weight of the photopolymerizable composition.

Cure of the photopolymerizable composition of the present invention can be achieved by exposure to near ultraviolet radiation from the sun in the range of 3000 to 4000 Å, or ultraviolet radiation having a wavelength ranging from 1850 Å to 4000 Å. Through the use of photosensitizers the useful wavelengths for cure can be extended into the visible and near infrared wavelengths from 4000 to 15,000 Å. The lamp system used to generate such radiation can consist of ultraviolet lamps such as from 1 to 50 discharge lamps, for example, xenon, metallic halide, metallic arc, such as a low, medium or high pressure mercury vapor discharge lamp, having an operating pressure of from a few millimeters to about 10 atmospheres, can be employed.

The advantageous characteristics of the present invention including, inter alia, the ability of the photocurable composition described above to cure by exposure to relatively low intensity radiation and its inherent high solids, essentially 100 percent reactive, render the compositions highly useful in the finishing or coating of structures or large equipment such as storage tanks, buildings, floors, automobiles, sheet metal plate and any heat-sensitive substrate including paper and plastic products.

The following non-limiting examples will serve to further illustrate the present invention.

EXAMPLE 1

The following compositions set forth in Table 1, below, illustrate the acceleration effect of such accelerators as tetrahydrofurfuryl alcohol and other alcohols. The compositions were cured as 0.5 mil films over contrast paper with three 100 watt mercury lamps at a line speed of 225 ft/min. One mil films were cured by solar radiation at 34° 10' latitude, 94° 33' longitude on Julian date 84046.

TABLE 1

| Composition No. | 1 | 2 | 3 | 4 | 5 |
|---|---|---|---|---|---|
| Components: | | | | | |
| UVR-6110 (1) | 95.5 | 79.5 | 63.6 | 63.6 | 74.0 |
| Tetrahydrofurfuryl Alcohol | — | — | 15.9 | — | — |
| Cellosolve (2) | — | — | — | 15.9 | — |
| Ethylene Glycol | — | — | — | — | 5.5 |
| Trimethylolpropane Triacrylate | — | 15.0 | 15.0 | 15.0 | 15.0 |
| Irgacure 184 (3) | — | 1.0 | 1.0 | 1.0 | 1.0 |
| Triphenylsulfonium Hexafluorophosphate | 2.0 | 2.0 | 2.0 | 2.0 | 2.0 |
| plasticizer (4) | 2.0 | 2.0 | 2.0 | 2.0 | 2.0 |
| FC-430 (5) | 0.5 | 0.5 | 0.5 | 0.5 | 0.5 |
| Initial Methyl Ethyl Ketone rubs (Mercury lamp cure) | 1 | 2-3 | 7 | 5 | 6 |
| Tack free time/minutes (Solar Cure) | 65 | 50 | 5 | 20 | 16 |

(1) Union Carbide - Cycloaliphatic epoxide.
(2) Eastman Chemical - Ethylene glycol monoethyl ether.
(3) Ciba-Geigy - Hydroxy Cyclohexyl Phenyl Ketone
(4) Solvent for Triphenylsulfonium Hexafluorophosphate.
(5) 3M Company - Fluorocarbon surfactant.

As can be seen in Table 1, tetrahydrofurfuryl alcohol increases the initial solvent resistance of the 0.5 mil films cured by conventional ultraviolet sources and accelerates the cure to tack free of the one mil solar cured films.

Also, the compositions in Table 1 illustrate that other ether alcohols or diols accelerate the cure of the hybrid photocure system of the present invention. Additional accelerators such as alcohols, ether alcohols, glycols, and polyols usefully employed in the present invention include:

| Structure | Nomenclature |
|---|---|
| 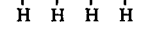 | n-butanol |
| 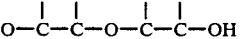 | diethylene glycol |
| 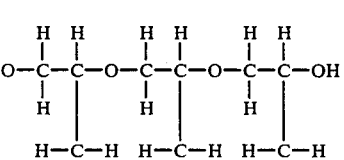 | tripropylene glycol |
| 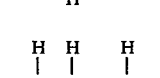 | glycerine |
| 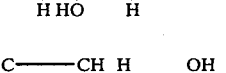 | furfuryl alcohol |
|  | polyethylene oxide diols n = 2 to 20 |
| 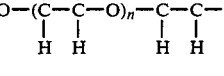 | polyethylene oxide triols n = 1 to 20 |

EXAMPLE 2

The following compositions shown below in Table 2 illustrate the use of mixtures of alcohols as the accelerator in the hybrid photocure system. One mil films of the compositions were cured over contrast paper using three one hundred watt medium pressure Mercury lamps at a line speed of 150 ft/min. Additionally, one mil films were cured by exposure to solar radiation for five minutes at 340° 10' latitude, 94° 33' longitude on Julian date 85067.

TABLE 2

| Composition No. | 1 | 2 | 3 | 4 |
|---|---|---|---|---|
| Components: | | | | |
| UVR-6110 (1) | 80.0 | 60.0 | 60.0 | 60.0 |
| Tetrahydrofurfuryl alcohol | — | 10.0 | 10.0 | 5.0 |
| Tone TM 0200 (2) | — | 10.0 | — | 10.0 |
| Tone TM 0310 (3) | — | — | 10.0 | 5.0 |
| Glycerolpropoxy triacrylate (4) | 3.0 | 3.0 | 3.0 | 3.0 |
| Hexanediol diacrylate | 12.0 | 12.0 | 12.0 | 12.0 |
| Triphenylsulfonium Hexafluorophosphate | 2.0 | 2.0 | 2.0 | 2.0 |
| Irgacure 651 (5) | 1.0 | 1.0 | 1.0 | 1.0 |
| Plasticizer (6) | 2.0 | 2.0 | 2.0 | 2.0 |
| Methyl Ethyl Ketone Rubs (Mercury Lamp) | 7 | 18 | 15 | 15 |
| Methyl Ethyl Ketone Rubs (Solar Cure) | 40 | 92 | 95 | 60 |

(1) Union Carbide - Cycloaliphatic Epoxide.
(2) Union Carbide - difunctional polyol.
(3) Union Carbide - trifunctional polyol.
(4) Celanese Chemicals.
(5) Ciba-Geigy - 2,2 dimethoxy-2-phenylacetophenone.
(6) Solvent for Triphenylsulfonium Hexafluorophosphate.

As can be seen in Table 2, the use of mixtures of diols, or triols or mixtures of diols and triols with, preferably, tetrahydrofurfuryl alcohol accelerates the cure of the hybrid photocure system by solar and conventional U.V. radiation.

EXAMPLE 3

The compositions set forth in Table 3 illustrate the acceleration effect on compositions containing the slower reacting glycidyl type epoxies. One mil films were cured using three 100 watt medium pressure Mercury lamps at a line speed of 150 ft/min. Additionally, one mil films were cured by exposure to solar radiation for five minutes at 34° 10' latitude, 94° 33' longitude on Julian date 84171.

TABLE 3

| Composition No. | 1 | 2 | 3 | 4 | 5 | 6 |
|---|---|---|---|---|---|---|
| Components: | | | | | | |
| UVR-6110 (1) | 96.0 | 76.8 | 76.8 | 61.4 | 64.0 | 51.2 |
| Epon 828 (2) | — | — | 19.2 | 19.2 | 16.0 | 16.0 |
| Trimethylol Propane Triacrylate | — | — | — | — | 4.5 | 4.5 |
| Hexanediol Diacrylate | — | — | — | — | 7.5 | 7.5 |
| 2-Ethylhexyl Acrylate | — | — | — | — | 3.0 | 3.0 |
| Tetrahydrofurfuryl Alcohol | — | 19.2 | — | 15.4 | — | 12.8 |
| Cationic Photoinitiator (3) | 4.0 | 4.0 | 4.0 | 4.0 | 4.0 | 4.0 |
| Radical Photoinitiator (4) | — | — | — | — | 1.0 | 1.0 |
| Methyl Ethyl Ketone Rubs (Mercury lamp cure) | 3 | 12 | 4 | 9 | 10 | 15 |
| Methyl Ethyl Ketone Rubs (Solar cured) | 25 | 46 | 17 | 25 | 100 | 100+ |

(1) Union Carbide - cycloaliphatic epoxide.
(2) Shell Chemical Co. - diglycidylepoxy of Bisphenol A.
(3) Triphenylsulfonium hexafluorophosphate contains 50 percent plasticizer as solvent.
(4) Aceto Chemical Co., Inc. - 2,2-diethoxyacetophenone.

The results shown in Table 3 illustrate the acceleration effect of tetrahydrofurfuryl alcohol on mixtures of cycloaliphatic and glycidyl epoxides. In all cases the compositions containing tetrahydrofurfuryl alcohol are at least one third greater in initial methyl ethyl ketone resistance than compositions without tetrahydrofurfuryl alcohol.

EXAMPLE 4

Listed in Table 4 below are compositions which illustrate the variety of cationically polymerizable materials that can be used in the invention. One mil films were cured over contrast paper with three 100 watt medium pressure Mercury lamps and by five minutes exposure to solar radiation at 34° 10' latitude, 94° 33' longitude on Julian date 84171.

TABLE 4

| Composition No. | 1 | 2 | 3 |
|---|---|---|---|
| Components: | | | |
| UVR-6110 (1) | 51.2 | 51.2 | 51.2 |
| Oxetane | 16.0 | — | — |
| Tetrahydrofuran | — | 16.0 | — |
| Dioxane | — | — | 16.0 |
| Tetrahydrofurfuryl Alcohol | 12.8 | 12.8 | 12.8 |
| Trimethylolpropane Triacrylate | 4.5 | 4.5 | 4.5 |
| Hexanediol Diacrylate | 7.5 | 7.5 | 7.5 |
| 2-ethyl hexylacrylate | 3.0 | 3.0 | 3.0 |
| Triphenylsulfonium Hexafluorophosphate | 2.0 | 2.0 | 2.0 |
| 2,2-diethoxy Acetophenone | 1.0 | 1.0 | 1.0 |
| Plasticizer (2) | 2.0 | 2.0 | 2.0 |
| Methyl Ethyl Ketone Rubs (Mercury lamp) | 33 | 29 | 18 |
| Methyl Ethyl Ketone Rubs (Solar cured) | 50 | 40 | 41 |

(1) Union Carbide - Cycloaliphatic Epoxy.
(2) Solvent for photoinitiator.

All of the compositions set forth in Table 4 cured to over 100 methyl ethyl ketone rubs after 24 hours.

Oxo containing materials in addition to dioxane and tetrahydrofuran which can be usefully employed in the invention are listed below.

| Structure | Nomenclature |
|---|---|
| 2,2,4,4-tetramethylfuran structure | 2,2,4,4-tetramethylfuran |
| pyran structure | pyran |
| trioxane structure | trioxane |

-continued

| Structure | Nomenclature |
|---|---|
| (structure diagram) | Trimethylolpropane oxetane (3-Ethyl-3-Hydroxymethylol-oxetane) |

EXAMPLE 5

Compositions listed in Table 5 below illustrate the type and level of vinyl or acrylate functional materials that can be used in the hybrid photocure system. One mil films were cured over contrast paper using three 100 watt medium pressure mercury lamps or by exposure to solar radiation for 5 minutes. Resin A was prepared by reacting 3 moles propylene glycol with 1.8 moles phthalic anhydride and 1 mole maleic anhydride to a 30 to 40 acid number.

TABLE 5

| Composition No. | 1 | 2 | 3 | 4 | 5 |
|---|---|---|---|---|---|
| Components: | | | | | |
| UVR-6110 (1) | 64.0 | 51.2 | 51.2 | 36.5 | 51.2 |
| Epon 828 (2) | 16.0 | 16.0 | 16.0 | 11.4 | 16.0 |
| Tetrahydrofurfuryl Alcohol | — | 12.8 | 12.8 | 9.1 | 10.8 |
| Trimethylolpropane Triacrylate | 4.5 | 4.5 | 4.5 | 11.4 | 4.5 |
| Hexanediol Diacrylate | 7.5 | 7.5 | — | 19.0 | 7.5 |
| Resin A | — | — | 7.5 | — | — |
| 2-Ethylhexyl Acrylate | 3.0 | 3.0 | 3.0 | 7.6 | — |
| Tone TM M 100 (3) | — | — | — | — | 5.0 |
| Triphenylsulfonium Hexafluorophosphate | 2.0 | 2.0 | 2.0 | 2.0 | 2.0 |
| 2,2-diethoxy Acetophenone | 1.0 | 1.0 | 1.0 | 1.0 | 1.0 |
| Plasticizer (4) | 2.0 | 2.0 | 2.0 | 2.0 | 2.0 |
| Initial Methyl Ethyl Ketone Rubs (Mercury lamp) | 10 | 15 | 16 | 100 | 33 |
| Initial Methyl Ethyl Ketone Rubs (Solar cured) | 100 | 100+ | 36 | 100+ | 100+ |

(1) Union Carbide - Cycloaliphatic epoxide.
(2) Shell Chemical Co. - Diglycidyl epoxy of Bisphenol A.
(3) Union Carbide - Epsilon caprolactone modified hydroxy functional acrylate monomer.
(4) Plasticizer is solvent for Triphenylsulfonium hexafluorophosphate.

Composition No. 4 contains 40 percent acrylate component, and this level is reponsible for the initial methyl ethyl ketone resistance to be in excess of 100 rubs. The remaining compositions contains 15 to 17 percent acrylate component. Thus, it can be seen in Table 5 that 40 percent acrylate component can be solar cured in air. Additionally, unsaturated polyesters may be used in the invention. Finally, a hydroxy functional monoacrylate may be used as an alternative diluent in place of simple mono-functional acrylates, to give films with increased solvent resistance.

This latter fact is shown by the increased methyl ethyl ketone resistance of composition No. 5 compared to composition No. 2 not containing any tone TM M 100.

Other unsaturated polyester resins can be used, such as those containing isophthalic acid, terephthalic acid, endomethylene tetrahydrophthalic anhydride, tetra and hexahydrophthalic anhydride reacted with neopentylglycol, 1,6 hexanediol, hydrogenated bisphenol A, Dow resin 565 and other glycols which are common to the practice of this art, and an unsaturated component such as maleic and fumaric acids. These compositions are combined with ethylenically unsaturated compounds such as styrenes, methylmethacrylate, and the like, which function as a coreactant and diluent.

Monofunctional or polyfunctional acrylates which can be used in this invention include 2-ethylhexyl acrylate and methacrylate, butyl, ethyl, octyl, stearyl, dicyclopentadiene epoxide, glycidyl acrylate and methacrylate, hydroxyethyl, hydroxypropyl acrylate and methacrylate. Other ethylenically unsaturated compounds include styrene, vinyl toluene (ortho, meta and para), alpha methyl styrene, vinyl acetate and the vinyl ethers. Allyl compounds such as allyl alcohol, diallyl phthalate are also useful in the present invention.

Other compounds usefully employed in the present invention include abietic acid and alcohol, vegetable oils and reaction products of dicyclopentadiene such as cyclopentadiene acrylate and methacrylate, maleic anhydride, fumaric and common glycol compounds. Hydroxyl and carboxyl functional polyesters and acrylate esters of epoxide compounds such as the Epon 828 compound from Shell Chemical and the cycloaliphatic epoxides manufactured by Union Carbide.

In the following example, rutile titanium dioxide and a yellow iron oxide pigment were dispersed in UVR-6110 and subsequently blended with the balance of the hybrid system:

EXAMPLE 6

| Weight (%) | Material | Function |
|---|---|---|
| 11.8 | Rutile Titanium Dioxide | Pigment |
| 5.1 | Micronized Yellow Iron Oxide | Pigment |
| 50.8 | UVR-6110 | Epoxide monomer |
| 12.0 | Trimethylolpropane triacrylate | Acrylic monomer |
| 12.7 | Tetrahydrofurfuryl alcohol | Accelerator |
| 0.4 | FC-430 | Wetting agent |
| 0.8 | Isobutylbenzoin ether | Radical photoinitiator |
| 3.2 | 2-Chlorothioxanthanone | Photosensitizer |
| 3.2 | Triphenylsulfonium hexafluorophosphate | Cationic photoinitiator |

In Example 6 is included a photosensitizer, 2-chlorothioxanthanone, so as to get through-cure in pigmented film. Example 6 gave essentially the same cure characteristics as the clear film from Example 1, composition Number 3.

EXAMPLE 7

The following example illustrates the use of the hybrid photocure system of the present invention as a clear over print varnish for paper substrates.

One and one-half parts by weight of adhesion promoting polyvinyl chloride-polyvinyl acetate copolymer, UCAR ®, VMCC, is added to 98.5 parts by weight of composition No. 3 in Example 1. The coating was roller coat applied at 0.3 mil to paper substrate and cured at 225 ft/min. with three 100 watt medium pressure mercury vapor lamps.

The resulting coating yields a 65 degree Gardner gloss of 90, excellent adhesion to inks, a coefficient of friction less than 30% for an inclined plane using a 1,000 gram weight, and has a yellow index of 55.0 without the use of optical brighteners.

EXAMPLE 8

The following composition demonstrates the exterior durability of the hybrid photocure composition. A one mil clear film was applied over a DuPont Rynite 935 Nylon panel previously coated with a conventional thermoset black basecoat. The coating was cured at 40 ft/min. with three one hundred watt medium pressure Mercury lamps.

| Material | PBW | Use |
| --- | --- | --- |
| UVR-6110 (1) | 39.3 | Cycloaliphatic epoxide |
| THFA (tetrahydrofurfuryl alcohol) | 9.8 | Accelerator |
| Hexanediol diacrylate | 32.1 | difunctional acrylic |
| 2-Ethylhexyl Acrylate | 12.9 | Monofunctional acrylic |
| FC-508 (2) | 2.5 | Cationic photoinitiator |
| Irgacure 651 (3) | 2.9 | free radical photoinitiator |
| FC-430 (4) | 0.5 | Wetting agent |

(1) Union Carbide - Cycloaliphatic Epoxy.
(2) 3M - Cationic photoinitiator.
(3) Ciba-Geigy - 2,2 dimethoxy-2-phenylacetophenone.
(4) 3M - Fluorocarbon Surfactant.

The coating has a solvent resistance of over 100 methyl ethyl ketone rubs, a pencil hardness of H-2H, excellent cross hatch adhesion, and a 20° gloss of 90+. Additionally, the coating did not exhibit any mud cracking, checking or peeling and had excellent adhesion after 1000 hours of exposure in a QUV Weatherometer.

EXAMPLE 9

The following example demonstrates the use of the hybrid photocure system, as a coating for flat sheet tin free steel used in the container industry. 99.2 parts of composition number 2, example 2, were mixed with 0.3 part lanolin, and 0.5 part 3M fluorocarbon surfactant FC-430. The coating was applied at 12 to 14 mg/4 in$^2$ and cured at 100 ft/min. with three 100 watt medium pressure Mercury bulbs followed by a 10 minute bake at 400° F. Number 211 ends were fabricated and tested for fabrication with CuSO$_4$ solution and processed for two hours at 250° F. at 15 psi. The coating had excellent fabrication, excellent adhesion, and did not blush after process.

What is claimed is:

1. A photopolymerizable composition comprising
   (a) a polymerizable epoxy-containing material,
   (b) a polymerizable monomer or monomers selected from the group consisting of ethylenglycol diacrylate, hexane-1,6-diol diacrylate, propoxylated bisphenol A diacrylate, propoxylated bisphenol A dimethacrylate, trimethylolpropane diacrylate, pentaerythritol triacrylate, pentaerythritol trimethacrylate, trimethylolpropane triacrylate, trimethylolpropane trimethacrylate, hexane-1,6-diol dimethacrylate, 1,3-butylene glycol dimethacrylate, diethylene glycol diacrylate, neopentyl glycol diacrylate, pentaerythritol tetraacrylate and polyethylene glycol diacrylate,
   (c) an effective amount of, as a cationic photoinitiator, an aromatic sulfonium compound or an aryliodonium salt,
   (d) an effective amount of a carbonyl type photoinitiator which is capable of photodecomposing to free radicals in the presence of UV light and
   (e) tetrahydrofurfuryl alcohol as an accelerator,
   wherein the number of epoxy equivalents ranges from 14 to 1.2 per accelerator equivalent.

2. A photopolymerizable composition comprising
   (a) a polymerizable epoxy-containing material,
   (b) a polymerizable monomer or monomers selected from the group consisting of ethylenglycol diacrylate, hexane-1,6-diol diacrylate, propoxylated bisphenol A diacrylate, propoxylated bisphenol A dimethacrylate, trimethylolpropane diacrylate, pentaerythritol triacrylate, pentaerythritol trimethacrylate, trimethylolpropane triacrylate, trimethylolpropane trimethacrylate, hexane-1,6-diol dimethacrylate, 1,3-butylene glycol dimethacrylate, diethylene glycol diacrylate, neopentyl glycol diacrylate, pentaerythritol tetraacrylate and polyethylene glycol diacrylate,
   (c) an effective amount of, as a cationic photoinitiator,
      (i) an aromatic sulfonium compound having the formula

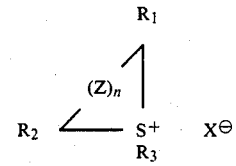

wherein
R$_1$, R$_2$ and R$_3$, each independently represent an aromatic group having 4–20 carbon atoms or an alkyl group having 1–20 carbon atoms, with the proviso that at least one of R$_1$, R$_2$ and R$_3$ is an aromatic group,
Z is oxygen, sulfur,

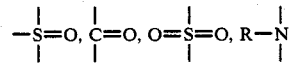

wherein R is an aryl having 6–20 carbon atoms or acyl having 2–20 carbon atoms, a carbon-to-carbon bond or R$_4$

wherein R$_4$ and R$_5$ are selected from the group consisting of hydrogen, alkyl having 1–4 carbon atoms and alkoxy having 2–4 carbon atoms,
n is 0 or 1 and
X$^\ominus$ is an anion, or
   (ii) an aryliodonium salt of the formula

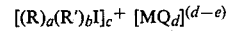

wherein
R is a monovalent aromatic organic radical,
R' is a divalent aromatic radical,
M is a metal or metalloid, Q is a halogen radical,
a is a whole number equal to 0 or 2,
b is a whole number equal to 0 or 1,
the sum a+b is equal to 2 or the valence of I, c=d=e,
e is equal to the valence of M and is an integer equal to 2 and 7 and
d>e and is an integer having a value up to 8,
(d) an effective amount of a carbonyl type photoinitiator which photodecomposes to free radicals in the presence of UV light and
(e) tetrahydrofurfuryl alcohol as an accelerator, wherein the number of epoxy equivalents ranges from 14 to 1.2 per accelerator equivalent.

3. The photopolymerizable composition of claim 2 wherein said carbonyl type photoinitiator is benzophenone, acetophenone, methylethyl ketone, valerophenone, hexanophenone, α-phenylbutyrophenone, dibenzosuberone, p-diacetylbenzene, 4'-methoxyacetophenone, benzaldehyde, α-tetralone, 2-acetylphenanthrene, 10-thioxanthenone, 9-fluorenone, 1-indanone, thixanthene-9-one, xanthene-9-one, 7-H-benz[d]anthracene-7-one, 1-naphthaldehyde, fluorene-9-one, 1'-acetonaphthone, 2'-acetonaphthone, o-methoxybenzophenone, benz[a]anthracene-7,12-dione, benzoin isopropyl ether, 1,1-dimethoxy-1-phenyl acetophenone, benzoin isobutyl ether, benzoin tetrahydropyranyl ether, 2,2-diethoxyacetophenone, 2,2-dimethoxy-2-phenylacetophenone, 2,3-butanedione, hydroxycyclohexyl phenyl ketone or benzil.

4. The photopolymerizable composition of claim 2 wherein said aromatic sulfonium compound is
triphenylsulfonium tetrafluoroborate,
methyldiphenylsulfonium tetrafluoroborate,
dimethylphenylsulfonium hexafluorophosphate,
triphenylsulfonium hexafluorophosphate,
triphenylsulfonium hexafluoroantimonate,
diphenylnaphthylsulfonium hexafluoroarsenate,
tritolylsulfonium hexafluorophosphate,
anisyldiphenylsulfonium hexafluoroantimonate,
4-butoxyphenyldiphenylsulfonium tetrafluoroborate,
4-chlorophenyldiphenylsulfonium hexafluoroantimonate,
tris(4-phenoxyphenyl)sulfonium hexafluorophosphate,
di(4-ethoxyphenyl)methylsulfonium hexafluoroarsenate,
4-acetonylphenyldiphenylsulfonium tetrafluoroborate,
tris(4-thiomethoxyphenyl)sulfonium hexafluorophosphate,
di(methoxysulfonylphenyl)methyl sulfonium hexafluoroantimonate,
di(methoxynaphthyl)methyl sulfonium tetrafluoroborate,
di(carbomethoxyphenyl)methyl sulfonium hexafluorophosphate,
4-acetamidophnyldiphenylsulfonium tetrafluoroborate,
dimethylnaphthylsulfonium hexafluorophosphate,
trifluoromethyldiphenylsulfonium tetrafluoroborate,
methyl(N-methylphenothiazinyl)sulfonium hexafluoroantimonate,
phenylmethylbenzylsulfonium hexafluorophosphate,
10-methylphenoxathiinium hexafluorophosphate,
5-methylthianthrenium hexafluorophosphate,
10-phenyl-9,9-dimethylthioxanthenium hexafluorophosphate,
10-phenyl-9-oxothioxanthenium tetrafluoroborate,
5-methyl-10-oxothianthrenium tetrafluoroborate, and
5-methyl-10,10-dioxothianthrenium hexafluorophosphate.

5. The photopolymerizable composition of claim 2 wherein said aryliodonium salt is
4,4'-dimethyldiphenyliodonium hexafluoroarsenate,
4,4'-di-t.-butyldiphenyliodonium hexafluoroarsenate,
4,4'-diisopropyldiphenyliodonium hexafluoroarsenate,
4,4'-diisopropyldiphenyliodonium tetrafluoroborate,
4,4'-dimethyldiphenyliodonium hexafluoroborate,
4,4'-dimethyldiphenyliodonium hexafluorophosphate,
4,4'-diisopropyldiphenyliodonium hexafluorophosphate and
4,4'-diisopropyldiphenyliodonium hexafluoroantimonate.

6. The photopolymerizable composition of claim 2 which also contains as an accelerator, in admixture with said tetrahydrofurfuryl alcohol, (i) a dihydroxy alcohol or (ii) a trihydroxy alcohol or (iii) a mixture of (i) and (ii).

7. The photopolymerizable composition of claim 2 wherein said cationic photoinitiator is present in an amount of 0.06 to 6.0 percent by weight based on the total weight of said composition.

8. The photopolymerizable composition of claim 2 wherein said carbonyl type photoinitiator is present in an amount of 0.1 to 10 percent by weight based on the total weight of said composition.

9. A substrate coated with the cured composition of claim 1.

* * * * *